Feb. 14, 1933.  K. MORSBACH  1,897,762
MOTION PICTURE CAMERA
Filed June 18, 1930
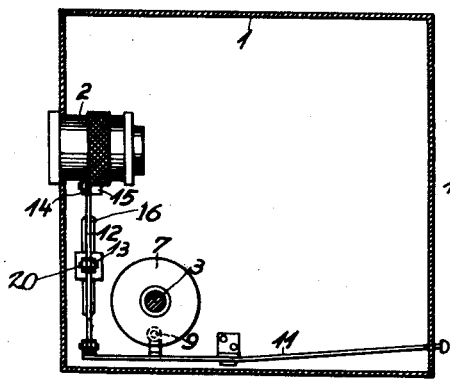
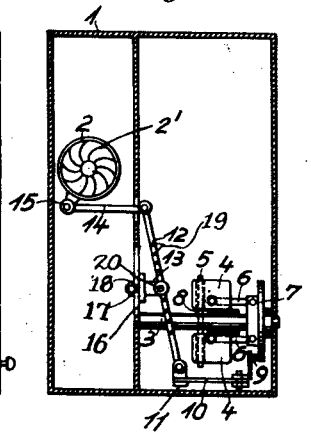
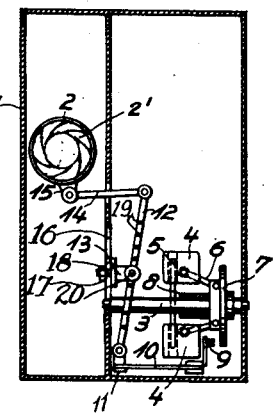
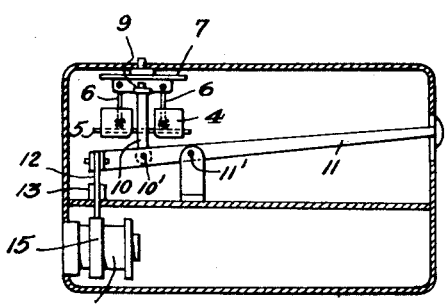
INVENTOR
KURT MORSBACH
BY
ATTORNEYS.

Patented Feb. 14, 1933

1,897,762

UNITED STATES PATENT OFFICE

KURT MORSBACH, OF BERLIN-LICHTERFELDE, GERMANY, ASSIGNOR TO SIEMENS & HALSKE, AKTIENGESELLSCHAFT, OF SIEMENSSTADT NEAR BERLIN, GERMANY, A CORPORATION OF GERMANY

MOTION-PICTURE CAMERA

Application filed June 18, 1930, Serial No. 461,881, and in Germany July 19, 1929.

My invention relates to motion-picture cameras, and more particularly to motion-picture cameras driven by clockwork so designed that the cameras are not only suitable for taking the usual motion-picture photographs, but also time retarded or time accelerated motion pictures. The essential feature of my invention is that the opening of the objective is automatically enlarged or reduced as soon as the control gear of the clockwork or other driving mechanism is brought into the position for taking time retarded or time accelerated pictures. This equipment is of particular value for motion-picture cameras used by amateurs because even when taking retarded or accelerated pictures it is only necessary that the operator adapt the diaphragm of the objective in the usual manner to the conditions of the light and changes the clockwork or other drive over in such a way that the camera will make time retarded or time accelerated pictures. Simultaneously with the changing over of the clockwork or other drive, the diaphragm of the objective is either opened further in correspondence with the short exposure during the taking of time retarded pictures or closed further in correspondence with the longer exposure during the taking of time accelerated pictures. A further advantage of my invention resides in the fact that the amateur photographer who in consequence of bad light requires a comparatively large opening even for ordinary photographs is unable to carry out the change-over for retarded photographs at all because this change-over is prevented by the coupling with the diaphragm.

The connection of clockwork control with the effective aperture of the objective provided according to my invention enables me furthermore to adjust different running off speeds for one and the same scene by operating a knob or lever, and to obtain constant exposures at all times. This feature is particularly valuable for taking trick photographs.

An embodiment of my invention is by way of example illustrated in the drawing annexed to my specification and forming part thereof. In the drawing:

Fig. 1 is a side elevation of my improved camera in diagrammatic representation, Fig. 2, a sectional front elevation of the camera with the control gear for the clockwork or other drive in the position in which the control mechanism drives the camera with the speed usual in ordinary motion-picture photography, Fig. 3, a view similar to Fig. 2 but showing the different position of the control gear for the clockwork or other drive after the change-over for taking retarded photographs; and Fig. 4 is a plan view, with parts in section.

Like parts are indicated by like numerals of reference throughout all the figures of the drawing.

Referring to the drawing 1 is the case or box of a motion-picture camera in the interior of which there is housed an objective 2 with an adjustable aperture diaphragm, for instance an iris diaphragm 2'. 3 is a shaft driven by the clockwork or other mechanism, not shown, upon which is mounted a centrifugal governor. This centrifugal governor comprises the weights 4 adapted to slide along a guide rod 5 rigidly connected to the shaft 3.

The centrifugal weights 4 are by means of rods 6 connected to a brake disc 7. Upon the shaft 3 is rigidly mounted a sleeve or bushing 8, the object of which will be explained lower down. During the production of normal pictures, the brake disc 7 cooperates with a brake cushion or brake block 9 mounted on a slidable rod 10. The rod 10 is at one end 10' pivoted to a hand lever 11 adapted to rock in the case 1 of the camera the fulcrum of said lever being indicated at 11'. This hand lever 11 is also connected with one arm of a double-armed lever 12 pivoted within the case 1 at 13. The other arm of the lever 12 is by means of a connecting rod 14 joined to lever 15 controlling the aperture of the diaphragm of the objective.

The mode of operation of my improved mechanism is as follows: If it is desired that the camera should feed the film strip with that speed which is necessary for taking ordinary motion-pictures, the control gear is in the position illustrated in Fig. 2 of the drawing. The brake block 9 is so near the brake disc 7 that the brake disc is forced against the brake block 9 as soon as the weights 4 move outwards under the action of the centrifugal force, so that a braking action is exerted upon the clockwork. The clockwork thus runs down comparatively slowly. The lever 15 controlling the aperture of the objective diaphragm is then in such a position that the aperture of the diaphragm actually corresponds to the diaphragm aperture set by the user of the apparatus.

If it is now desired to change over for time retarded photographs, the control mechanism is brought into the position shown in Fig. 3 by rocking the lever 11 around its pivot. In this way the aperture of the objective is automatically increased in correspondence to the shorter exposure available for each single picture, and simultaneously the brake block 9 is withdrawn to such an extent that even when the shaft 3 is rotating the brake disc 7 will no longer engage the brake block 9. The movement of the brake disc 7 is limited by the free end of the bushing 8 mounted on the shaft 3 and engaged by said disc when the centrifugal weights fly apart. The clockwork is thus no longer braked in the position of the control members illustrated in Fig. 3 so that the camera is capable of producing time retarded pictures.

The operation of my improved camera takes place in a corresponding manner when taking time accelerated pictures the individual adjusting or setting movements being, of course, effected in the opposite direction to the setting for time retarded pictures. When taking the time accelerated pictures the brake block 9 is moved still closer up to the brake disc 7 than when taking ordinary photographs. The running down speed of the clockwork then drops below the speed for taking ordinary photographs. The lever 15 of the objective diaphragm is simultaneously moved still further towards the left than shown in Fig. 2 so that the iris diaphragm of the objective is closed still further. Thus no over exposure will occur although the time of exposure during the taking of accelerated photographs is longer than when taking ordinary motion pictures.

According to a further embodiment of my invention the pivot 13 for the lever 12 may be made adjustable so that the leverage of the double-armed lever 12 may be varied. By varying the ratio of the arms of the lever the enlargement of the opening of the objective may be regulated according to whether time retarded or time accelerated motion-pictures should be taken at a higher or lower speed. This adjustment may be carried out by providing a vertical slot 16 through which the fulcrum support bolt 17 passes. The bolt 17 may be secured at any point along the vertical slot 16 by means of the nut 18. The position of the fulcrum 13 with respect to the lever 12 may be changed by providing a plurality of spaced apertures 19 through which the pivot pin 20 may pass. In this way the length of the lever arms of the lever 12 may be varied. The mechanism for shifting the pivot 13 of the lever 12 may be connected with a special regulating device, not shown in the drawing, for the running down speed of the clockwork.

Various structural modifications may, of course, be made in the mechanism without departing from the spirit of my invention or the ambit of the appended claims.

I claim as my invention:

1. In a motion-picture camera with time retarding and time accelerating equipment, means for adjusting the speed of the camera drive, a lever connected with said adjusting means, an adjustable objective diaphragm likewise connected with said lever, and an adjustable fulcrum for said lever, whereby alteration may be effected in the ratio between the speed adjustment and the diaphragm adjustment secured by the movement of said lever.

2. In a motion picture camera having time retarding and time accelerating equipment, an adjustable objective diaphragm, a lever connected to said objective diaphragm for changing the size of the aperture of said objective, a driven shaft, braking means for controlling the speed of said shaft, and a second lever connected both to said braking means and said first mentioned lever for automatically changing the size of the objective aperture in accordance with the change effected in the speed of the shaft.

3. In a motion picture camera having time retarding and time accelerating equipment, a driven shaft, means for controlling the speed of said shaft comprising an adjustable brake drum and a brake disk secured to said shaft and slidable thereon toward and from said brake drum in accordance with the speed of rotation of said shaft, a lever for adjusting the position of said brake drum, an adjustable objective diaphragm and a second lever connected to said diaphragm and also to said first named lever to be operated thereby.

4. In a motion picture camera having time retarding and time accelerating equipment, a casing, a driven shaft, means for controlling the speed of said shaft, said means comprising a brake disk slidably mounted on the shaft but rotatable therewith, centrifugal means for moving said disk in accordance with the speed of the shaft, and a brake drum adapted to be adjusted near said brake disk to engage the same to slow down the shaft when said shaft rotates faster than a predetermined speed, a pivoted lever terminating outside of said casing and connected with said brake drum for adjusting said drum in a plurality of positions with respect to said disk, an adjustable objective diaphragm in said casing, a pivoted lever connected to said first mentioned lever, and a link connecting said second mentioned lever to said objective diaphragm.

In testimony whereof I affix my signature.

KURT MORSBACH.